UNITED STATES PATENT OFFICE.

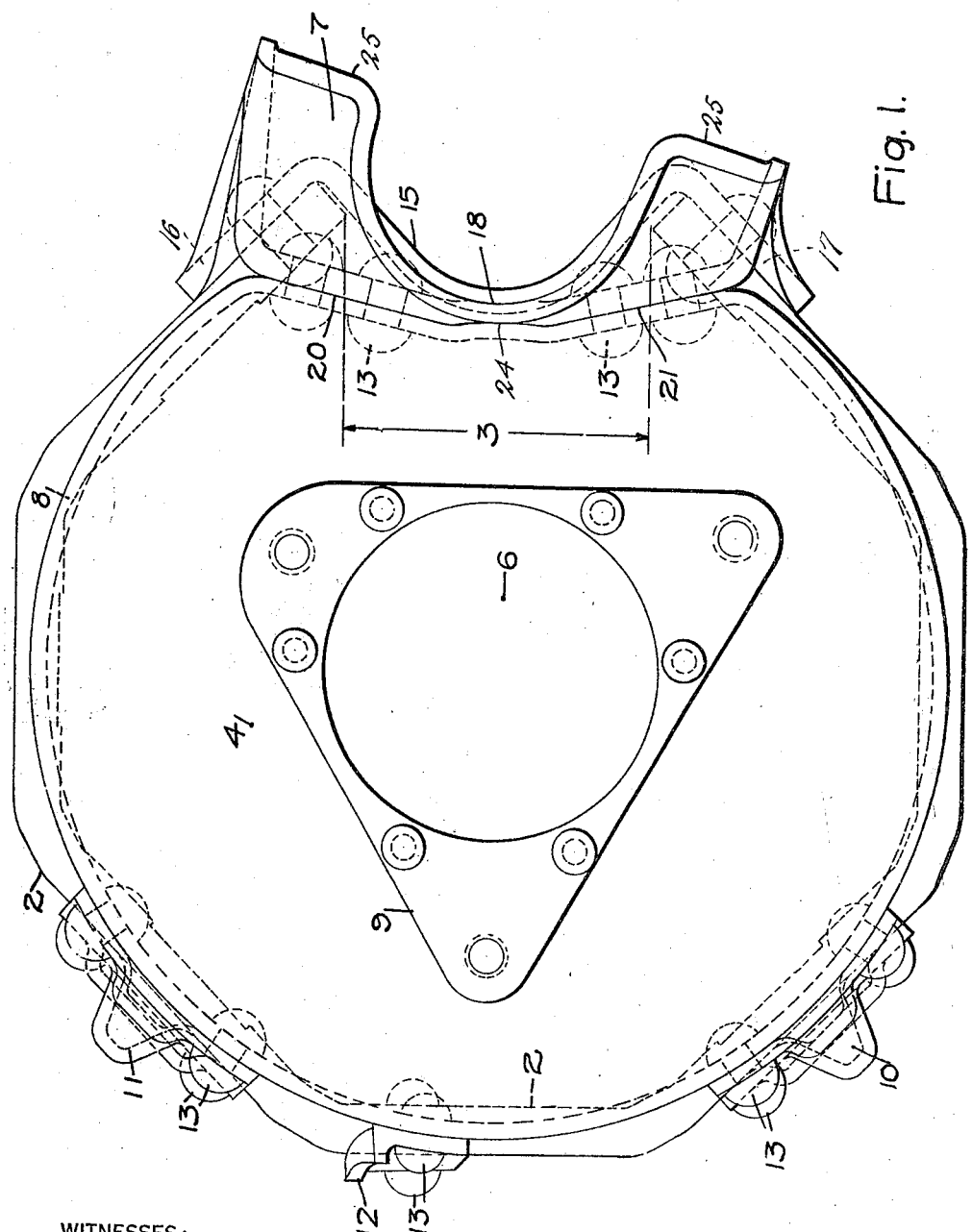

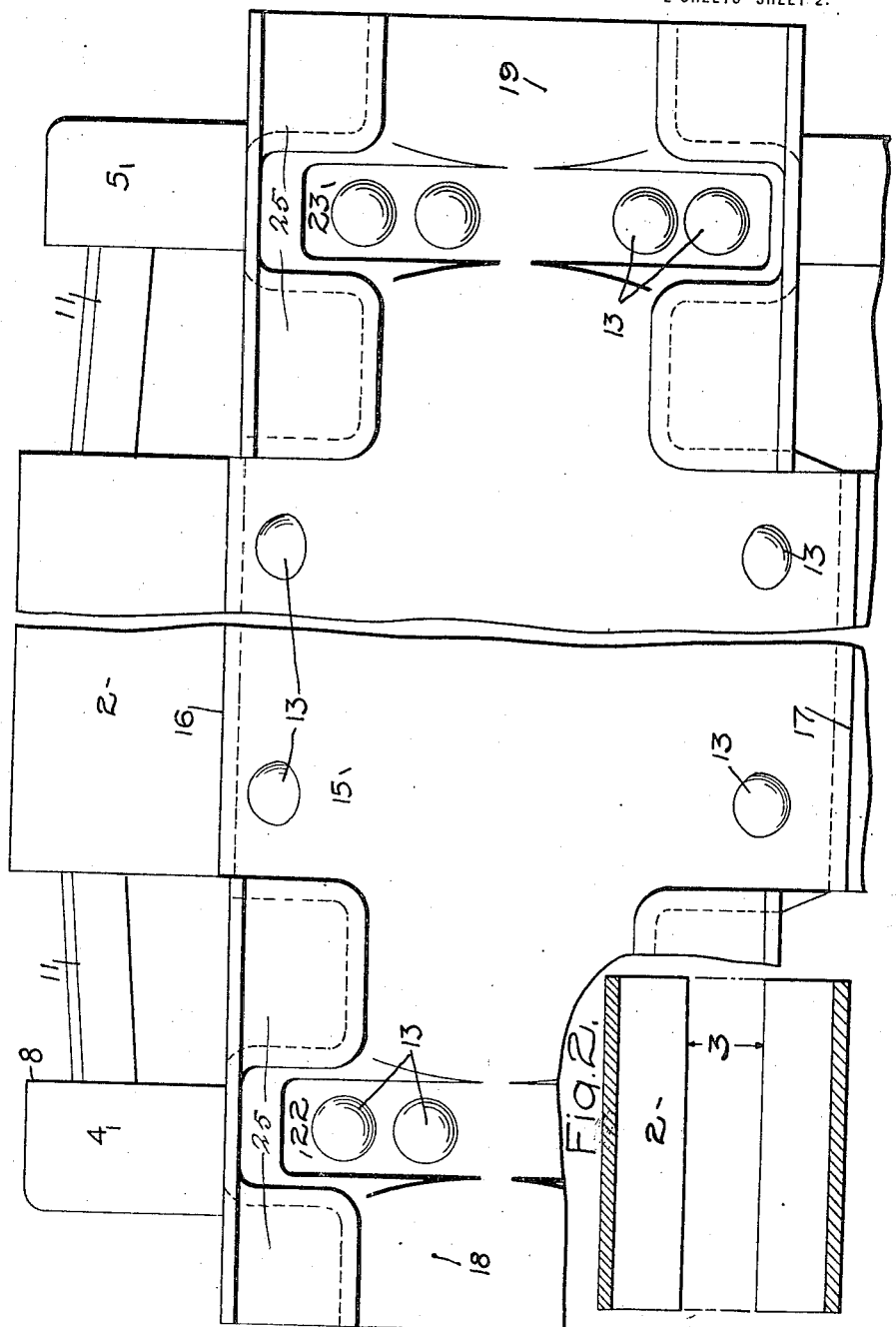

CHARLES W. STARKER, OF PITTSBURGH, AND MYLES B. LAMBERT, OF EDGEWOOD PARK, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC-MACHINE FRAME.

1,326,302.  Specification of Letters Patent.  Patented Dec. 30, 1919.

Application filed September 21, 1916. Serial No. 121,417.

*To all whom it may concern:*

Be it known that we, CHARLES W. STARKER, a subject of the Emperor of Germany, and a resident of Pittsburgh, in the county of Allegheny and State of Pennsylvania, and MYLES B. LAMBERT, a citizen of the United States, and a resident of Edgewood Park, in the county of Allegheny and State of Pennsylvania, have invented a new and useful Improvement in Dynamo-Electric-Machine Frames, of which the following is a specification.

Our invention relates to dynamo-electric machines and especially to the construction of stator frames for electric railway motors and the like.

The object of our invention is to provide a structure of the above-indicated character which shall be particularly light in weight and simple and inexpensive in construction, without impairing the desirable mechanical and electrical characteristics or properties of the machines.

We accomplish the end in view by the elimination of parts that are unnecessary for either mechanical or electrical reasons, and we thus obtain the ultimate weight reduction while providing sufficient magnetizable material to constitute a suitable magnetic circuit and to secure the necessary strength and ruggedness of parts. Wherever practicable, we have employed pressed-steel parts to secure maximum strength for minimum weight, as hereinafter more fully set forth.

More specifically stated, it is the object of our invention to provide a stator frame, embodying a yoke or incasing member having a gap in one side and an axle-bracket of suitable magnetic dimensions, that is located in the gap and is suitably secured to the incasing member.

In the accompanying drawings, Figure 1 is a view in end elevation of a dynamo-electric machine frame, constructed in accordance with our invention; Fig. 2 is a longitudinal sectional view on a reduced scale, of the incasing member that is shown in Fig. 1; and Fig. 3 is a view in side elevation, with parts broken away, of the structure that is illustrated in Fig. 1.

Referring to the drawings, the structure shown comprises a suitable magnetizable incasing or yoke member 2, here shown as being substantially polygonal in form, and having a gap or opening 3 in one side, for a purpose to be described; a pair of end-bells or end-rings 4 and 5, which are severally spaced from the ends of the yoke member 2 and are severally provided with centrally-located openings 6, for reasons to be set forth; and an axle-inclosing member or axle-bracket 7 that is located in the gap 3 and is suitably secured to the yoke member 2 and the end rings 4 and 5, as subsequently described in detail.

The yoke or incasing member 2, as more clearly shown in Fig. 2, is of relatively large cross-section that is suitable for constituting the main magnetic circuit of the machine and is adapted to receive a plurality of pole pieces or polar projections (not shown), in accordance with customary practice. The incasing member is preferably formed of rolled-steel or other material of suitably high permeability, whereby the desired magnetic characteristics are provided with a minimum of space and weight requirements.

The end rings 4 and 5 are provided with circumferential rims or flanges 8, to which the axle-bracket 7 and other connecting members to be described, may be secured. A suitable reinforcing plate member 9, of triangular or other shape, is disposed around each central opening 6, being suitably secured to the corresponding end-ring. The openings 6 are provided for the purpose of receiving armature bearing-housings of ordinary construction, as will be understood.

A pair of tie-pieces or connecting members 10 and 11 are suitably spaced from the axle-bracket 7 and, together with a suspension bar 12 of a familiar type, are secured to the incasing member 2 and the end-bells 4 and 5 by suitable rivets 13, or in some other appropriate manner. For the purpose of obtaining the necessary stiffness of the tie-pieces, they are preferably provided with suitable pressed-out bosses or ribs, thereby securing a maximum of resistance to deformation with a relatively light-weight member. Thus, the incasing member and the end-rings are secured together by means of suitably-spaced magnetizable members, and the required degree of rigidity and ruggedness of the frame is secured.

The axle-bracket 7 is located within the gap 3 of the incasing member 2 and is provided with an inner centrally disposed surface 15 which is substantially cylindrical in shape and is prolonged by tongues or lugs 16 and 17, which are bent to respectively overlap the confronting edges of the incasing member 2 and are secured thereto through the agency of suitable rivets 13 or otherwise. The end-portions of the axle bracket are also provided with cylindrical inner surfaces 18 and 19 for the purpose of receiving the brasses for supporting the truck axle, in accordance with familiar practice.

The outer side of the axle bracket is provided near its respective ends with pockets 22 and 23 in the surfaces 18 and 19, respectively, the bottom portions of which form sloping flat surfaces 20 and 21 that abut against complementary surfaces 24 of the end-rings 4 and 5, respectively, to which the axle-bracket is secured by means of a plurality of the rivets 13 disposed in the pockets 22 and 23.

The axle bracket 7 is of such dimensions that the necessary mechanical strength, as well as the requisite magnetic cross-section is provided. However, it will be found that the usual pressed-steel type of axle-bracket that has been previously employed with a continuous or complete yoke member will be suitable for use in the present machine frame without substantial alteration, and will provide the desired mechanical and electrical characteristics.

It will be noticed by reference to Fig. 3 that the material is pressed into such shape that the pockets are provided near the ends of the axle bracket and the cylindrical surface 15 constitutes a similar centrally disposed depression which has a length substantially equal to the width of the incasing member 2. The formation of the axle bracket 7 forms no material part of our invention, and it is believed that no further description thereof will be necessary here, as the essential features of the construction will be familiar to those skilled in the art, being very similar to that shown and described in Patent No. 1,198,080. The axle bracket 7 is provided with outer flat surfaces 25 to which similar flat surfaces of a suitable axle cap (not shown) may be attached in any desired manner to complete the axle-receiving inclosure, the brasses being clamped between the inner cylindrical surface of the axle cap and the surfaces 18 and 19.

The structure shown thus comprises a central yoke or incasing member of suitable dimensions to constitute the main magnetic circuit of the machine and provided with a gap in one side, a pair of end-rings spaced apart from the yoke member and adapted to receive and support a pair of bearing-housings, a pair of tie-pieces and a suspension bar that are secured to the incasing member and the end-rings and, in particular, the axle-bracket 7 which is adapted to mechanically and magnetizably bridge the gap in the incasing member in such manner that the requisite strength and rigidity is imparted to the frame as a whole, and moreover, the magnetic dimensions of the axle bracket are sufficient to form a substantially unrestricted path of relatively low magnetic reluctance for the main flux that traverses the motor frame.

In this way, we secure a dynamo-electric machine frame that is particularly light in weight, simple and inexpensive in construction and readily adaptable to all sizes of machines. Moreover, the weight reduction has been accomplished without sacrificing the electrical characteristics or desirable mechanical properties of the machine frame.

If it is desired to cover the openings between the respective end-rings and the incasing member, for the purpose of excluding dust or moisture from the interior of the machine, these openings may be closed by suitable covers (not shown) preferably of sheet-steel, whereby the desired result may be obtained without adding much weight to the machine frame.

We do not wish to be restricted to the specific structural details or arrangement of parts herein set forth, as various modifications thereof may be effected without departing from the spirit and scope of our invention. We desire, therefore, that only such limitations shall be imposed as are indicated in the appended claims.

We claim as our invention:

1. A frame for dynamo-electric machines embodying a magnetizable incasing member having a gap in one side and a bearing-holding means for mechanically and magnetizably bridging said gap.

2. A frame for dynamo-electric machines embodying a magnetizable incasing member having a gap in one side and axle-bearing inclosing means adapted to also bridge said gap.

3. A frame for dynamo-electric machines embodying a magnetizable incasing member having a gap in one side and axle-bearing inclosing means bridging said gap and adapted to suitably complete the magnetic circuit of said incasing member.

4. A frame for dynamo-electric machines embodying a magnetizable incasing member having a gap in one side, an axle-bracket of suitable magnetic-circuit dimensions located in said gap, and means for securing said bracket and said incasing member together.

5. A frame for dynamo-electric machines embodying a magnetizable incasing member having a gap in one side, a pair of end-rings, axle-inclosing means bridging said gap, and means for securing said axle-inclosing means to said incasing member and said end-rings.

6. A frame for dynamo-electric machines embodying a magnetizable incasing member having a gap in one side, a pair of end-rings spaced apart from said incasing member, an axle-bracket of suitable magnetic-circuit dimensions located in said gap, and means including said axle-bracket for securing said incasing member and said end-rings together.

In testimony whereof, we have hereunto subscribed our names this 31st day of August, 1916.

CHARLES W. STARKER.
MYLES B. LAMBERT.